Figure 1:
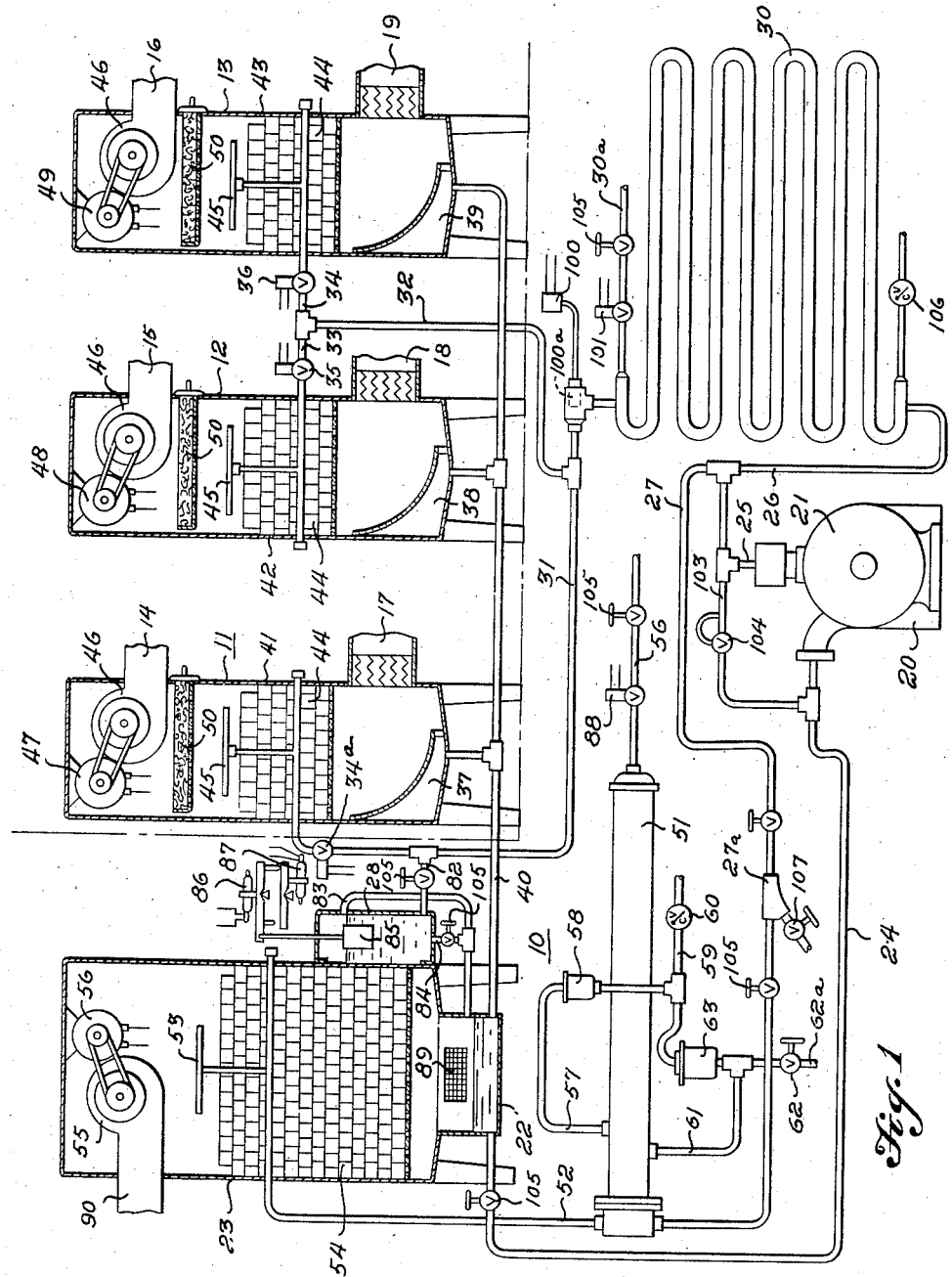

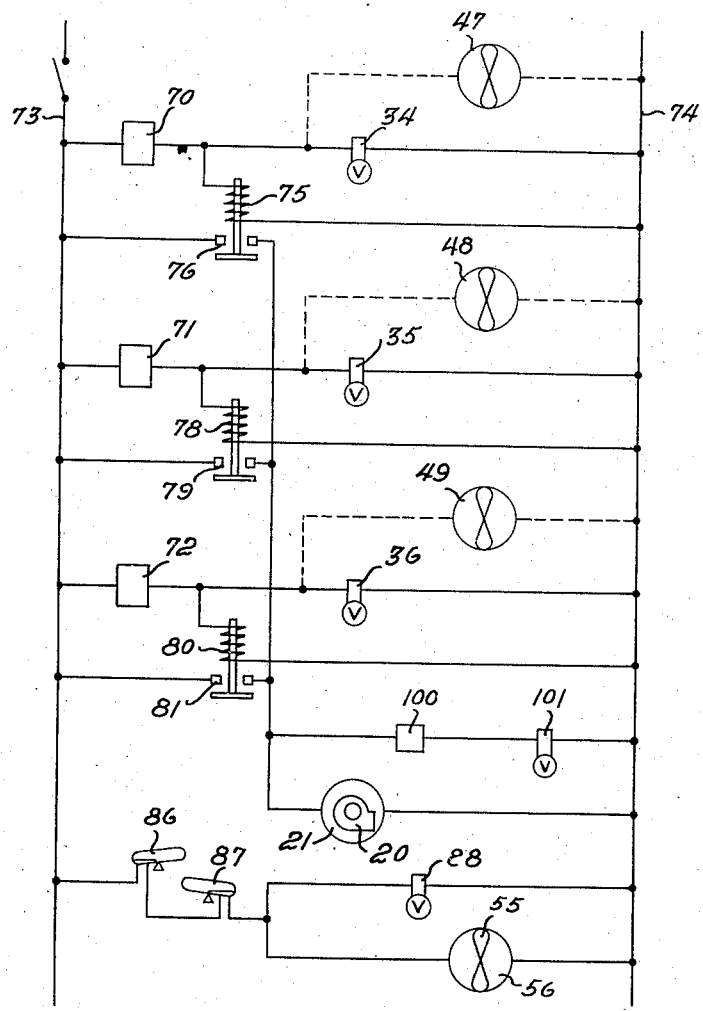

Patented Nov. 12, 1940

2,221,450

UNITED STATES PATENT OFFICE 2,221,450

REFRIGERATING APPARATUS

Chester S. Jennings, Syracuse, and Frank W. Gerard, De Witt, N. Y., assignors to General Motors Corporation, Dayton, Ohio, a corporation of Delaware Application January 22, 1936, Serial No. 60,278

3 Claims. (Cl. 261—3)

This invention relates to air or gas conditioning.

It is an object of this invention to provide an apparatus for conditioning air or gas at a plurality of points of use with a circulated medium which is regenerated at a central zone or plant.

Further objects and advantages of the present invention will be apparent from the following description, reference being had to the accompanying drawings, wherein a preferred form of the present invention is clearly shown.

In the drawings:

Fig. 1 is a diagrammatic representation of an apparatus embodying features of this invention; and Fig. 2 is a wiring diagram showing the controls for the apparatus shown in Fig. 1.

In practicing this invention, a central regenerating plant or zone is diagrammatically represented at 10. This plant 10 is capable of regenerating a hygroscopic liquid, such as that disclosed in the patent to Francis R. Bichowsky No. 1,992,177, Feb. 26, 1935, or other hygroscopic liquids. This liquid is circulated to one or more air or gas conditioning units or towers 11, 12 and 13 which are adapted to condition air and deliver conditioned air or gas through outlets 14, 15 and 16 to places of use, such as conveyors, enclosures, processing rooms or the like. These units are provided with inlets 17, 18 and 19 which receive air or gas from any suitable source, being either the outside atmosphere, the space for which the air or gas is being conditioned, a combination of both, or any other desired source.

The hygroscopic liquid is circulated by a pump 20 driven by a motor 21, and the connections are so arranged that this pump circulates the liquid to the regenerating means 10, and also to the conditioning units 11, 12 and 13. In order to accomplish this, the pump 20 is arranged to withdraw liquid from a sump 22 at the bottom of the liquid regenerating tower 23, the liquid flowing through pipe 24 to the pump 20 and from thence through the outlet 25 to the branches 26 and 27. The branch 26 eventually is connected with the conditioners 11, 12 and 13 and also with the control sump 28 while the branch 27 is connected with the regenerator as will be hereinafter more fully described.

The liquid going to the conditioning units 11, 12 and 13 preferably has its temperature controlled or modified so that the desired temperature and relative humidity characteristics are imparted to the air which is being conditioned. This is accomplished by providing a heat interchanger, heater or cooler 30 which imparts the desired temperature to the liquid passing from the branch 26, after which the liquid is distributed by the pipes 31, 32, 33 and 34 to the conditioning units. The flow of liquid to the particular units is controlled individually by proper valves 34ª, 35 and 36 so that the flow of liquid is either stopped or throttled in accordance with air conditions within the enclosure which receives the supply from each respective unit or in accordance with any other desired conditions. The liquid after passing through units 11, 12 and 13 is gathered respectively in the sumps 37, 38 and 39 and drains through the pipe 40 to the sump 22.

The conditioning units 11, 12 and 13 may be of any suitable type in which the hygroscopic liquid and the air or gas to be conditioned are contacted. The particular type diagrammatically shown includes air or gas conditioning towers 41, 42 and 43 which are provided with contact material 44, and liquid distributing rotary heads 45 which spray or distribute the liquid over the material. Air is circulated through the units by means of blowers 46 driven respectively by motors 47, 48 and 49. If desired filtering material 50 is provided in each of the units.

The regenerator 10 includes a heater 51 which heats the hygroscopic liquid flowing through the branch 27 and filter 27ª and from whence it is delivered in a heated condition through the pipe 52 to the distributing head 53 of the regenerating tower 23. From thence it flows, in a heated condition, through contact material 54 where it is brought in contact with air circulated by the blower 55, driven by the motor 56. The hygroscopic liquid at this point gives up moisture to the air, because of its heated condition, and is thus regenerated to the desired degree of concentration. The air circulated through the regenerating tower may come at 89 from any source either within or outside of the building in which the tower is located, and may be discharged at 90 either within or outside the building.

The temperature of the liquid delivered to the spray head 53 is automatically controlled by delivering steam or proper temperature or pressure through the pipe 56 to the heater 51. The heater 51 may be of any suitable type in which pipes or the like are provided for heat exchange of the liquid or steam while they are kept physically separate. Any uncondensed steam flows through the pipe 57 and thermostatic by-pass 58 to the pipe 59 provided with a check valve 60 and is delivered to a steam condenser, water heater or the like. The water from the condensed steam flows through the pipe 61 through valve 62 to any desired place by means of pipe 62a. A steam trap 63 is provided for automatically discharging any condensed water from pipe 59 to the pipe 62a.

Automatic controls are provided. Thus control switches or the like 70, 71 and 72 are provided to control the operation of the units 11, 12 and 13 respectively. These switches may be made responsive to relative humidity alone, to dry bulb temperature alone, to wet bulb temperature alone, or to a combination of all of these functions so as to be responsive to "effective temperatures." These switches may be placed within the space for which the air is conditioned, or at any other suitable place, such as at the discharge ducts 14, 15 and 16, or at the intake ducts 17, 18 and 19. When there is a demand for conditioned air or gas by the switch 70, suitable contacts therein are closed so that current flows from the line 73 to the line 74 through the switch 70, at the same time energizing the solenoid valve 34 and the blower motor 47, if desired. It is understood, however, that the blower motor 47 may be operated all of the time by placing it across the lines 73, 74, and that the solenoid valve 34 only may be controlled by the switch 70. When the switch 70 closes, the relay 75 is energized also, and this closes the contacts 76 which energizes the motor 21 of the pump 20. Likewise, when the switch 71 is energized the solenoid valve 35 is energized, and if desired the blower motor 48, it being understood that this motor may be operated also all the time if desired merely by placing it across the lines 73 and 74. When switch 71 closes, the relay 78 is energized thus closing the contacts 79 and likewise energizing the motor 21 if the same has not already been energized by the relay 75. Likewise, the switch 72 may energize the solenoid valve 36 and, if desired, the blower motor 49, it being understood that this motor may also operate all the time. At the same time, the relay 80 may be energized thus closing the contacts 81 and thus energizing the motor 21 if the same has not already been energized by the relays 75 or 78.

From the above it will be seen that whenever any one of the switches 70, 71 or 72 are actuated by air conditions to close their contacts, they cause the operation of their respective conditioning units by causing hygroscopic liquid to flow to their corresponding air or gas conditioning units 11, 12 or 13, and if desired also controlling the operation of the respective blowers 46. The switches also cause operation of the pump 20 as long as demand for conditioned air exists in any one of the conditioning units.

Means are provided for causing operation of the regenrating unit whenever the condition of the hygroscopic liquid requires regeneration while there is demand for air or gas conditioning. For this purpose a bleeder pipe 82 is provided which discharges into the sump 28. This sump is provided with an overflow at 83 and a relatively small drain at 84. The drain at 84 is so regulated that it has less capacity than the flow through the pipe 82 so that the sump tends to be filled up to the overflow 83 as long as liquid is supplied at 82; but automatically drains whenever the supply at 82 is cut off. A hydrostatic float 85 is placed in the sump 28 and this actuates the switches 86 and 87. Whenever the liquid becomes diluted to the point where regeneration is required, the float 85 closes the switch 86. While the sump 28 is full, the switch 87 is so calibrated that it acts in its closed position at all possible positions of the float 85 and opens only when the sump is drained. Under such circumstances when the sump is full and regeneration is required by the condition of the liquid a circuit is established in series through the switches 87 and 86 to the solenoid valve 88, which controls the flow of steam to the heater 51, and to the motor 56 which drives the fan 55.

From the above arrangement, it will be seen that whenever demand for conditioned air actuates any one of the switches 70, 71 or 72, the pump 20 starts and circulates liquid to the respective conditioning units 11, 12 or 13, at the same time circulating liquid to the sump 28 in sufficient quantities to fill the same to the overflow 83. If the liquid is sufficiently strong, the float 85 attains a position so that the switch 86 is open and no regeneration takes place. If, on the other hand, the liquid requires regeneration, the float 85 closes the switch 86 as well as the switch 87 and starts the regenerating operation. Whenever all of the conditioning units 11, 12 or 13, are cut off by their respective control switches, the pump 20 stops because all of the relays 75, 78 and 80 are deenergized, and this permits the sump 28 to drain at 84, thus causing the float 85 to sink to such an extent that the switch 87 is opened. Under such circumstances, no regeneration can take place until such time as there is demand for conditioned air.

If desired, the operation of the heat modifier or cooler 30 may be made dependent on a thermostatic switch 100 which energizes the solenoid valve 101 whenever the temperature of the liquid at bulb 100a requires it. The valve 101 controls the flow of water or other cooling fluid through pipe 30a and thus regulates the amount of cooling of the hygroscopic liquid. Thus the temperature of the liquid supplied to the conditioners is maintained at a predetermined degree. The switch 100 and valve 101 may be placed in series with the relays 75, 78 and 80 so that water flow occurs only when there is demand for air or gas conditioning.

As the demand for liquid by the air conditioners 11, 12 and 13 may cause different volumetric flows of liquid in pipe 27, a by-pass 103 may be provided with a pressure regulating valve 104. This by-pass is adapted to permit liquid to flow from the discharge side of the pump 20 to its intake side, and is adapted to maintain a constant discharge pressure on the pump. Thus whenever one or more of the air conditioners 11, 12 or 13 are cut off, a corresponding amount of liquid is by-passed from the discharge to the intake of the pump 20, as the pressure responsive valve 104 automatically opens a sufficient amount to compensate for this.

Suitable hand valves 105 may be provided for regulating or disconnecting various parts of the system and various check valves 106 may also be provided as required. The strainer 27a may be provided with a clean-out valve 107.

While the form of embodiment of the invention as herein disclosed, constitutes a preferred form, it is to be understood that other forms might be adopted, all coming within the scope of the claims which follow.

What is claimed is as follows:

1. Conditioning apparatus including a plurality of gas conditioning contact towers, a liquid heater, a liquid regenerating contact tower, a pump having an intake connected to said regenerating tower and discharge branches to said gas conditioning towers and to said liquid heater, cooling means for the liquid discharged to said gas conditioning towers, a discharge from said heater to said regenerating contact tower, individual controls for said gas conditioning contact towers, an automatic control for said pump starting said pump whenever any one of said gas conditioning towers operates and stopping said pump whenever all of said gas conditioning contact towers are idle, and means whereby said heater and said cooling means are rendered ineffective when said gas conditioning towers are idle.

2. Conditioning apparatus including a plurality of gas conditioning contact towers, a liquid heater, a liquid regenerating contact tower, a pump having an intake connected to said regenerating tower and discharge branches to said gas conditioning towers and to said liquid heater, and a discharge from said heater to said regenerating contact tower, individual automatic controls for said gas conditioning contact towers, and an automatic control for said pump starting said pump whenever any one of said gas conditioning towers operates and stopping said pump whenever all of said gas conditioning contact towers are idle.

3. Conditioning apparatus including a plurality of gas conditioning contact towers, individual controls for controlling the conditioning by said towers, a liquid heater, a liquid regenerating contact tower, a control sump, a pump for causing circulation of a hygroscopic liquid from said regenerating tower to said conditioning towers in parallel, and to said liquid heater and said regenerating contact tower in series, a hydrostat controlling the operation of said regenerating tower in accordance with the concentration and quantity of liquid in said sump, means for energizing said pump whenever one or more of said towers is required to operate, and means rendering said hydrostat inoperative whenever said pump is inoperative.

CHESTER S. JENNINGS.
FRANK W. GERARD.